June 29, 1926.  1,590,497
J. DE LA CIERVA
AEROPLANE WITH ROTATING WINGS
Filed March 31, 1923
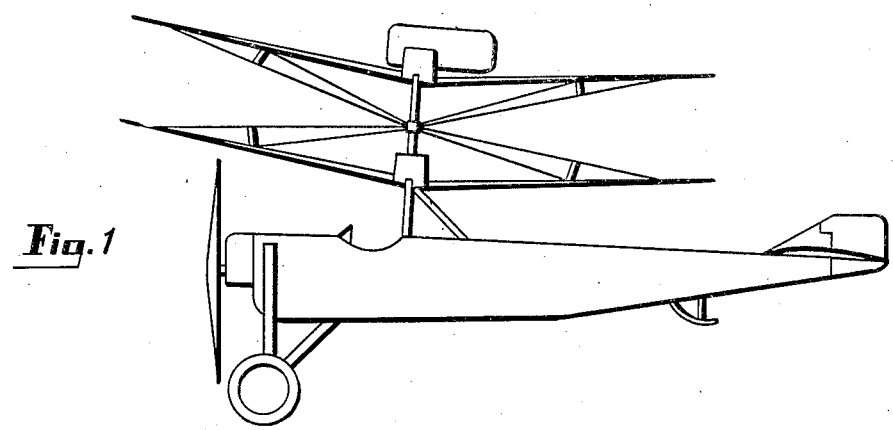
Fig. 1
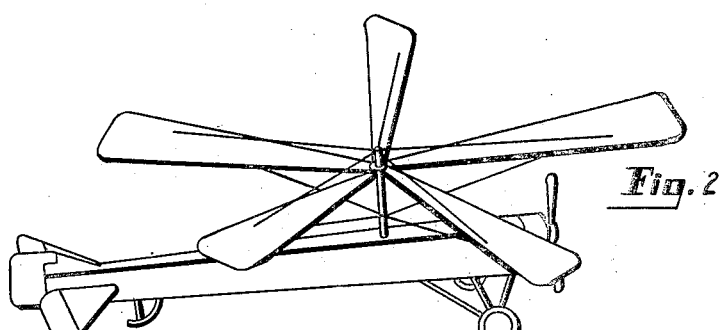
Fig. 2
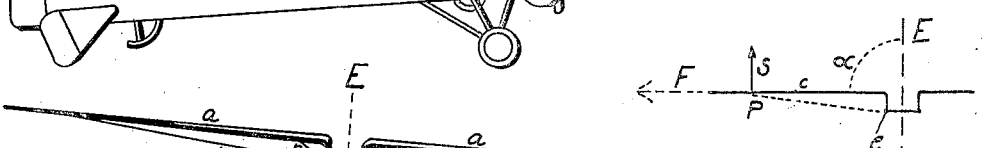
Fig. 3
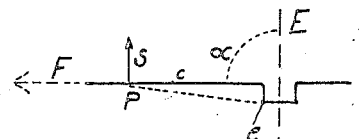
Fig. 4
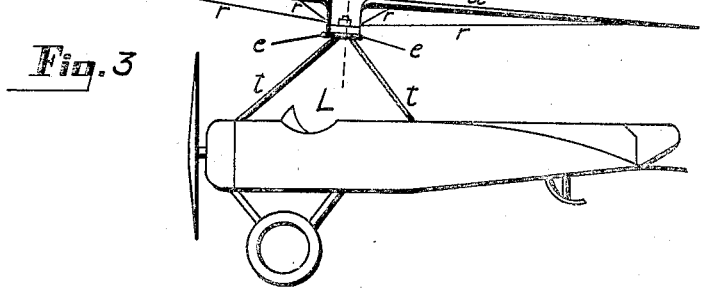
Fig. 5
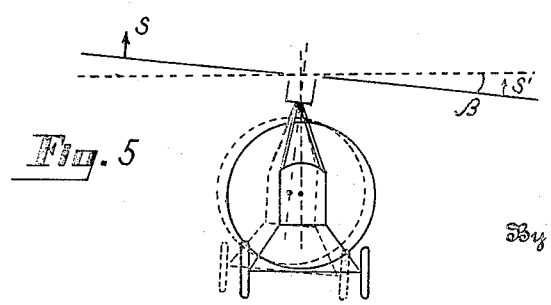
Inventor
Juan de la Cierva
By Emil Bönnelycke
Attorney Patented June 29, 1926.

1,590,497

UNITED STATES PATENT OFFICE.

JUAN DE LA CIERVA, OF MADRID, SPAIN.

AEROPLANE WITH ROTATING WINGS.

Application filed March 31, 1923, Serial No. 629,217, and in Spain April 18, 1922.

In my former British patent specification No. 165,748, I have described an aeroplane with rotating wings consisting essentially of an ordinary aeroplane provided with all the elements necessary for its progress and steering, such as the motor, propeller, undercarriage, rudder, etc. in which, however, the wings, instead of remaining fixed relatively to it, as in the ordinary aeroplane, revolve freely by virtue of the supporting reaction of the wind during forward movement upon them, around a shaft common to all of them and necessarily inclined backward.

In the accompanying drawings:—

Figures 1 and 2 are illustrations of such forms of machines.

Figures 3, 4 and 5 illustrate the present invention.

Figures 1 and 2 illustrate two different types of said known apparatus. The main defect of this known type of aeroplane, when all wings rotate in the same direction, lies in the lateral displacement of the centre of pressure in the assemblage of such rotating wings, due to the want of symmetry in the velocities of the advancing and the retreating wings relatively to the wind, an arrangement which necessitates the use of two groups of wings revolving in opposite directions, as in Figure 1, accompanied by aerodynamic and structural disadvantages, or else the counteraction of such want of symmetry by producing a lift on the opposite side, in which latter arrangement it is necessary to arrange the wings with a suitable negative inclination with reference to the rotating shaft and to construct them with wing sections of low aerodynamic power. The latter condition necessitates a very accurate calculation and a difficult and uncertain adjustment, as well as a considerable increase of the wing surface, as in Figure 2, and neither system does away with the structural difficulties inherent in the necessity of using shaft tubes capable of resisting great bending stresses and consequently of great weight and diameter, nor with the problems of bracing the wings of the requisite length.

The improvement which forms the subject matter of this invention consists in arranging the wings on a rotative member, in such a manner that each wing can move freely in a plane which contains the axis of rotation (or approximately so). The bearings required for all the wings are fixed to a common armature or support such as the said rotative member which is itself capable of rotating freely on a radial, axial or ball bearing connected through its other ring to the body of the aeroplane by means of some structural device, as for instance, a pyramid formed by four tubes. Figure 3 shows such an arrangement wherein monoplane wings are used —$e$—$e$— being the joints of the two symmetrical wings —$a$—$a$—, —$r$— the reinforcing braces of the wings, L the base or support of the wings which are mounted by bearings on the axis E supported on the tube pyramid —$t$—. The heavy shaft Figures 1 and 2, can thus be dispensed with. Similar arrangement would apply to the employment of wings for biplanes or multiplanes.

There need be no device for the change of pitch, nor need the upward swinging movement of the wings be limited. It is preferable however in order to avoid fouling the propeller or the ground to limit their downward movement by any suitable means such as for example, steel or rubber springs mounted in any convenient manner, for instance by securing one end to the upper surface of each wing and the other end to an upward extension of the axis of rotation.

The operation is as follows—When the aeroplane runs over the starting course, the system of wings acquires a rotary movement due to the action of the wind on the wings or if it is desired to shorten the run preliminary to taking off, an initial rotation may be imparted to the wing system by any suitable means. The speed of rotation generates a centrifugal force F, see Figure 4, applied to the centre of gravity of each wing C and acting perpendicular to the axis of rotation, while the lifting reaction S is directed perpendicularly to the wing, and both forces constantly balance each other, so that the resultant coincides with the straight line which connects the joint —$e$— of the wing with the point P of application of the lifting reaction, the consequence being that, under such conditions, the wing behaves at a given moment as if it were rigidly connected to the axis of rotation. The joint —$e$— should preferably be arranged more or less below the wing, according to the type of each apparatus, in such a manner that the angle $\alpha$ which aerodynamically the wing forms with the axis of rotation may be that which is suitable, that is, approximately a right angle.

Some of the advantages obtained are as follows:

1. The centering of pressure and lift is mechanical, and not aerodynamical, and the system by reason of its jointed construction cannot transmit moments which tend to tip the apparatus over. The aerodynamical lateral displacement of the centre of pressure gives rise to a slight inclination only of the means of rotation, see Figure 5, and consequently to a small deviation of the lifting reaction coinciding therewith, thereby causing the apparatus to incline slightly, an effect which may be neutralized by the twisting moment due to the engine and propeller, but which in any case is of no importance, its extent being represented by the small angle B (Fig. 5). The ability to use one group of wings all revolving in the same direction without requiring any rigid stays or any calculations for adjustment, or running any danger of the system getting out of order.

2. Owing to the absence of bending moments, the ability to dispense with a heavy shaft tube and its support and substituting a simple and light structural device.

3. The ability to use wing sections of the highest efficiency without any negative inclination and with a reduction of the necessary wing surface resulting therefrom.

4. Absolutely automatic stability, which is not dependent upon the aeroplane maintaining "flying speed", as in the case of fixed wing aeroplanes. The aeroplane of the present invention may be said to be supported by the joints of the wings which allow a temporary displacement of the plane of rotation of the wings relatively to the remainder of the apparatus, when a rolling motion tends to destroy stability. The lift applied to the axis of rotation produces moments opposed to a rolling motion.

It is clear that the invention is capable of modifications in the details of construction without altering its essential character.

Having now particularly described and ascertained the nature of my said invention and in what manner the same is to be performed I declare that what I claim is:

1. In aircraft, an aerofoil system comprising a plurality of wings mounted to rotate freely by virtue of the action of air currents upon them, a supporting structure secured to the body of the aircraft and constituting a center of rotation for the system and articulated joints between the wings and the supporting structure such that during rotation of the system each wing is capable of assuming at every moment a position in which the centrifugal force produced by rotation and the lift due to the action of the air-currents tend towards equilibrium.

2. In aircraft, an aerofoil system comprising a plurality of wings mounted to rotate freely by virtue of the action upon them of air currents, a supporting structure secured to the body of the aircraft and constituting a center of rotation for the system and articulated joints between the wings and said supporting structure permitting each wing to swing about an axis that is transverse to the axis of rotation, the joints being located relatively near to the center of rotation and below the aerodynamic plane of each wing.

3. In aircraft, an aerofoil system comprising a plurality of rotative wings flexibly jointed to a common supporting center of rotation so as to be capable of revolving freely, under the influence of an airstream, about an axis upwardly directed and so that each wing is free to swing about an axis that is transverse to the axis of rotation, whereby at all times during revolution of the system each wing may assume positions in which the centrifugal force produced by rotation and the lift due to the action of the airstream tend towards equilibrium.

4. In aircraft, a wing-supporting structure secured to the body of the aircraft, a bearing mounted on said supporting structure to rotate freely with its axis of rotation inclined to the axis of thrust of the propelling means of the aircraft, a plurality of wings symmetrically disposed about the axis of rotation and hinge-jointed to the said bearing at points closely adjacent the axis of rotation in such a manner that each wing is free to swing in a plane, perpendicular to that wherein it is at any instant rotating, the wing system being adapted to rotate freely by virtue only of the action of air currents on the wings.

In testimony whereof I affix my signature.

JUAN DE LA CIERVA.